(12) United States Patent
Moroz

(10) Patent No.: US 12,312,728 B2
(45) Date of Patent: May 27, 2025

(54) FRICTION DAMPER FOR DAMPENING OUT VIBRATIONS GENERATED BY A LAUNDRY TREATING MACHINE

(71) Applicant: AKSISTEM ELEKTROMEKANIK SANAYI VE TICARET LIMITED SIRKETI, Tekirdag (TR)

(72) Inventor: Ayse Moroz, Istanbul (TR)

(73) Assignee: AKSISTEM ELEKTROMEKANIK SANAYI VE TICARET LIMITED SIRKETI, Tekirdag (TR)

( * ) Notice: Subject to any disclaimer, the term of this patent is extended or adjusted under 35 U.S.C. 154(b) by 573 days.

(21) Appl. No.: 17/761,212

(22) PCT Filed: Oct. 23, 2020

(86) PCT No.: PCT/EP2020/079977
§ 371 (c)(1),
(2) Date: Mar. 17, 2022

(87) PCT Pub. No.: WO2021/078990
PCT Pub. Date: Apr. 29, 2021

(65) Prior Publication Data
US 2023/0349089 A1    Nov. 2, 2023

(30) Foreign Application Priority Data
Oct. 24, 2019 (EP) .................................. 19205152

(51) Int. Cl.
*D06F 37/20* (2006.01)
*F16F 7/08* (2006.01)

(52) U.S. Cl.
CPC ............... *D06F 37/20* (2013.01); *F16F 7/08* (2013.01)

(58) Field of Classification Search
CPC ........ F16F 7/09; F16F 7/08; F16F 2230/0064; F16F 7/023; F16F 2222/04; F16F 2230/36; D06F 37/20; D06F 37/24
See application file for complete search history.

(56) References Cited

U.S. PATENT DOCUMENTS 6,264,014 B1 *  7/2001  Ferlicca .................... F16F 7/09
                                                          188/129
6,955,248 B2 * 10/2005  Park ........................ D06F 37/20
                                                          188/129

(Continued)

FOREIGN PATENT DOCUMENTS

CN      100591832 C     2/2010
CN      109594295 A     4/2019

(Continued)

*Primary Examiner* — Robert A. Siconolfi
*Assistant Examiner* — Mahbubur Rashid
(74) *Attorney, Agent, or Firm* — Bayramoglu Law Offices LLC

(57) ABSTRACT

A friction damper for dampening out vibrations generated by a drum of a laundry treating machine includes a hollow piston body; a piston rod adapted to move telescopically along a central longitudinal axis of the hollow piston body; a friction element made of a resilient material interposed in between the hollow piston body and the piston rod, wherein a friction occurs when the piston rod moves relative to the hollow piston body; fixation portions provided at free ends of the piston rod and the hollow piston body to connect the friction damper to the laundry treating machine; at least one stopper portion interposed in between the hollow piston body and the piston rod for limitation of a motion of the friction element in a direction of the central longitudinal axis.

17 Claims, 11 Drawing Sheets

(56) References Cited

U.S. PATENT DOCUMENTS

| | | | |
|---|---|---|---|
| 7,445,098 B2 | 11/2008 | Peuker et al. | |
| 7,971,693 B2 * | 7/2011 | Peuker | F16F 7/09 267/196 |
| 9,297,434 B2 * | 3/2016 | Kanioz | D06F 37/20 |
| 9,618,073 B2 * | 4/2017 | Kanioz | F16F 7/09 |
| 2005/0183912 A1 | 8/2005 | Peuker et al. | |
| 2014/0090939 A1 * | 4/2014 | Kanioz | D06F 37/20 188/271 |
| 2016/0010261 A1 | 1/2016 | Kim et al. | |
| 2016/0208881 A1 | 7/2016 | Kanioz | |

FOREIGN PATENT DOCUMENTS

| | | |
|---|---|---|
| EP | 2600026 A1 | 6/2013 |
| KR | 101048092 B1 * | 7/2011 |
| KR | 101416184 B1 | 7/2014 |

* cited by examiner

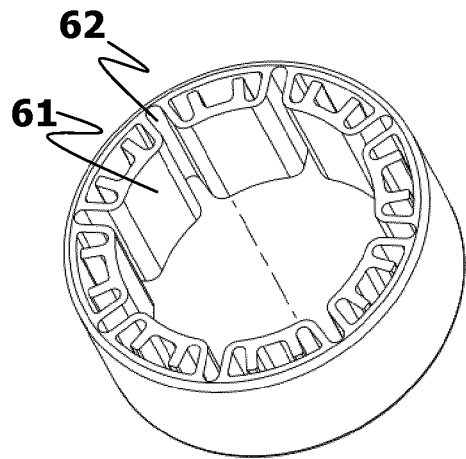
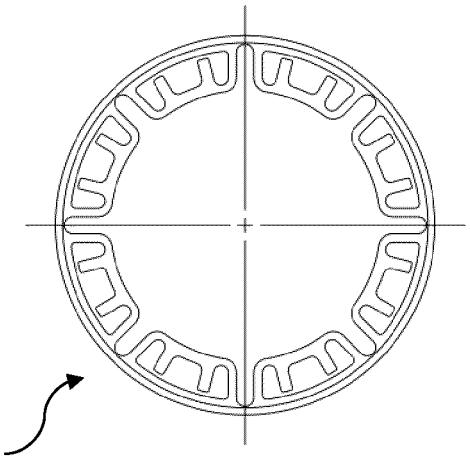
FIG. 8A      FIG. 8B
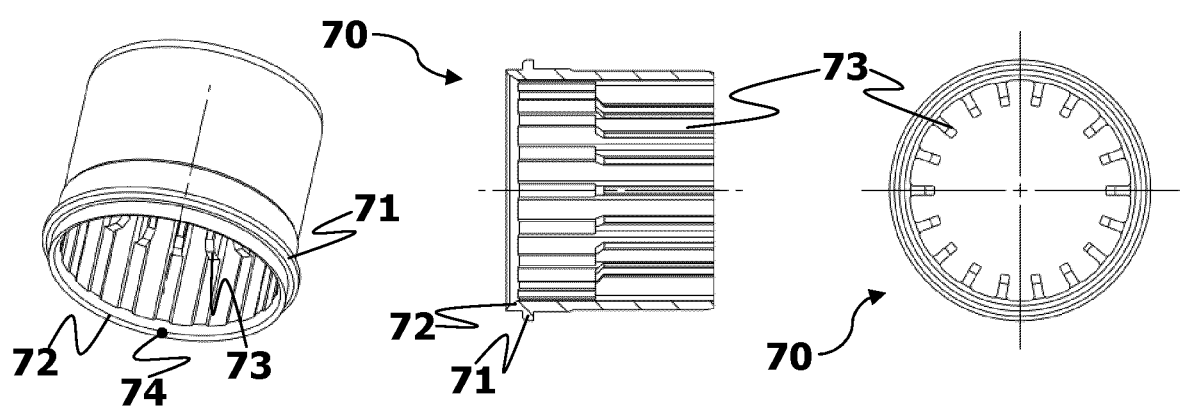
FIG. 9A      FIG. 9B      FIG. 9C

FRICTION DAMPER FOR DAMPENING OUT VIBRATIONS GENERATED BY A LAUNDRY TREATING MACHINE

CROSS REFERENCE TO THE RELATED APPLICATIONS

This application is the national stage entry of International Application No. PCT/EP2020/079977, filed on Oct. 23, 2020, which is based upon and claims priority to European Patent Application No. 19205152.2 filed on Oct. 24, 2019, the entire contents of which are incorporated herein by reference.

TECHNICAL FIELD

The present invention relates to a damper and more particularly to a friction damper for a laundry treating machine in which the damping force is enhanced and less noisy performance is achieved. The damper is used for dampening vibrations produced by drums of washing machines and/or spin dryers.

BACKGROUND

Laundry treating machines such as washing machines or spin dryers generally include a tub and a drum, an electric motor, a drive set and control devices that regulate their operation. When the drum of the laundry treating machine is rotating at high speeds, it produces vibrations due to unbalanced distribution of the laundry inside the drum. Friction dampers of the generic type are used for vibration damping in laundry treating machines, ensuring less vibrational and less noisy operation of the laundry treating machines. The friction dampers are capable of effectively reducing oscillation and are used to dampen and absorb the vibrations generated by the drums.

It is sufficient for a friction damper to freely move in the space formed in between the frame and the tumbler of a machine. As is known, in friction dampers, a friction element interposed between the piston rod and piston body which must be axially restrained in order to properly operate for generating a friction force when the piston rod telescopically moves inside the body. The disadvantage of such systems is that the there is no amplitude-dependent friction damping. Large and small amount vibratory movement may occur in the drum of the laundry treating machines.

For example, a large amount of vibration occurs in dewatering cycle or spin drying cycle and a small amount of vibration may occur during regular washing cycle. There is a need of a variable damping type damper capable of effectively minimizing the small and large vibrations with respect to the degree of vibratory forces.

U.S. Pat. No. 7,445,098 B discloses a damper having two fastening units mounted on a free end of a tubular casing and a tappet respectively. A frictional damping unit disposed inside the casing has an elastic frictional damping lining displaceable in the casing and the tappet along a central longitudinal axis for producing a damping effect.

EP 2,600,026 A1 discloses a damper comprising a piston body and a piston rod which adapted to move along the primary axis of said piston body. A friction element is located in between the piston rod and the piston body.

SUMMARY

An object of the present invention is to provide a friction damper which overcomes the drawbacks known in the friction dampers of the prior art.

Another object of the present invention is to provide a variable damping type friction damper in which rapidly reducing an amount of vibration is achieved and an increased friction effect is ensured.

Another object of the present invention is to provide a variable damping type friction damper which works quietly even in the case of extreme vibration amplitudes and produces a variable response in its dissipation of kinetic energy.

Another object of the present invention is to provide a friction damper in which an amount of noise occurring due to a collision of parts during vibratory movement is effectively reduced.

Another object of the present invention is to provide a friction damper which applies amplitude-dependent damping behavior in all directions of vibration. This effect can be realized with relatively simple means and by a simple structure as proposed by the present invention.

The present invention proposes a friction damper for dampening vibrations generated by a drum of a laundry treating machine, said damper comprising: a hollow piston body; a piston rod adapted to move telescopically along a central longitudinal axis of said piston body; a friction element made of a resilient material interposed in between the piston body and the piston rod such that friction occurs when said piston rod moves relative to said piston body; fixation portions provided at free ends of the piston rod and the piston body to connect the friction damper to the laundry treating machine; at least one stopper portion interposed in between the piston body and the piston rod for limitation of the motion of the friction element in the direction of the central longitudinal axis. According to the present invention, said at least one stopper portion has an inclined surface which is inclined with respect to the central longitudinal axis of said piston body. Furthermore, said inclined surface is positioned to face a flat impact surface of the friction element and is arranged to be stroked by said flat impact surface of the friction element. With this arrangement, the noise level is sufficiently reduced. Furthermore, the friction damper according to the present invention provides a more stable operational connection provided by a plurality of connection elements placed on the piston rod. The inclined surface is arranged to form an annular cavity between the stopper portion and the piston rod such that when the friction element hits the stopper portion, one of the free ends of the stopper portion smashes and enters partially into said annular cavity.

BRIEF DESCRIPTION OF THE DRAWINGS

The figures whose brief explanations are herewith provided are solely intended for providing a better understanding of the present invention and are as such not intended to define the scope of protection or the context in which said scope is interpreted in the absence of the description.

FIGS. 8A and 8B demonstrate perspective views of dampening means according to the present invention.

FIGS. 9A-9C demonstrate perspective views of a lower fixation element according to the present invention.

Figure 1:
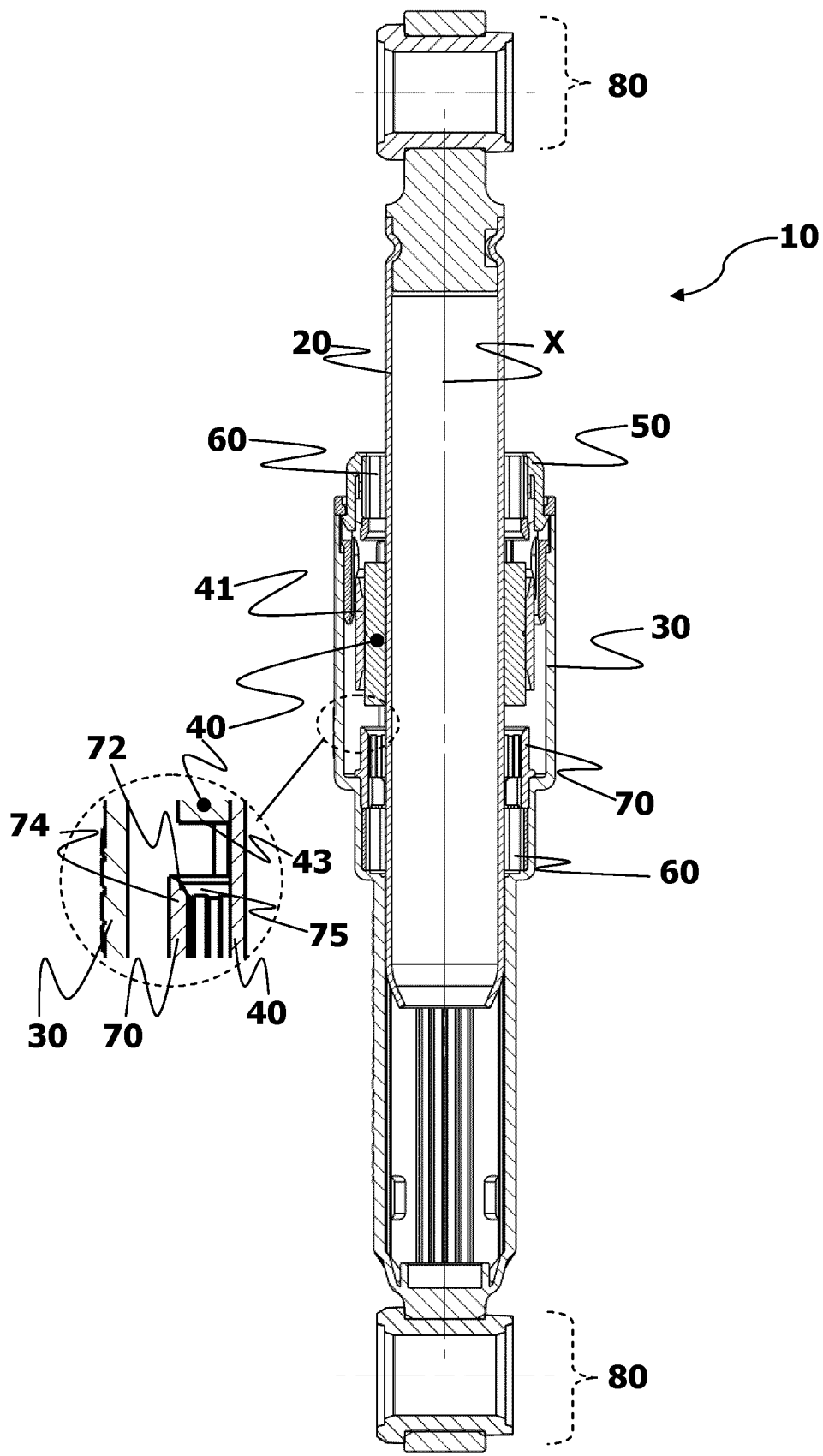
FIG. 1 demonstrates a cross-sectional view of the friction damper according to a first embodiment of the present invention.

The list of reference numerals used in the appended drawings is as follows;
10 Friction damper
20 Piston rod
30 Piston body
   31 Opening
40 Friction element
   41 Encapsulating element
   43 Flat impact surface
   44 Inner protrusion
   45 Flat impact surface
50 Locking ring
60 Dampening means
   61 Flexible portion
70 Lower fixation element
   71 Circular protrusion
   72 Inclined surface
   73 Reinforcement ribs
   74 Stopper portion
   75 Annular cavity
80 Fixing portion
   81 Fixing part
90 Upper fixation element
   91 Claw
   92 Inclined surface
94 Stopper portion
95 Upper seating element
96 Lower seating element
α inclination angle
X Central longitudinal axis

DETAILED DESCRIPTION OF THE EMBODIMENTS

While additional features and advantages of the present invention will be apparent from the detailed description, the main object of the invention is achieved in a friction damper (10) as set forth in claim 1. The present invention proposes a friction damper (10) for dampening vibrations generated by a laundry treating machine, basically comprising: a hollow piston body (30); a piston rod (20) adapted to move telescopically along a central longitudinal axis (X) of said piston body (30); a friction element (40) made of an elastically resilient material fixedly interposed in between the piston body (30) and the piston rod (20) such that friction occurs when said piston rod (20) moves relative to said piston body (30); fixation portions (80) provided at free ends of the piston rod (20) and the piston body (30) to connect the friction damper (10) to the laundry treating machine; at least one stopper portion (74, 94) interposed in between the piston body (30) and the piston rod (20) for limitation of the motion of the friction element (40) in the direction of the central longitudinal axis (X) by strike against the at least one stopper portion (74, 94). Said at least one stopper portion (74, 94) has an inclined contact surface (72, 92) with respect to the central longitudinal axis (X) of said piston body (30) and said inclined surface (72, 92) is positioned to face a flat impact surface (43, 45) of the friction element (40) and is arranged to be stroked by said flat impact surface (43, 45) of the friction element (40). According to the present invention, a variable response is achieved in the dissipation of kinetic energy during the movement of the piston rod (20) and piston body (30).

The piston rod (20) according to the present invention operates with the friction element (40) while moving telescopically inside the piston body (30) due to the vibrations caused by the unbalanced movements of the drum of a laundry treating machine, especially a washing machine or a spin dryer. Due to these vibrations caused by the unbalanced movements of the laundry in the drum, the oscillation amplitude of the friction damper (10) is variable. According to the present invention, the stopper portion (74, 94) has an inclined contact surface (72, 92) and is positioned to face a flat impact surface (43, 45) of the friction element (40) which results in that the friction element (40) having a circular cross-section is pressed more strongly against the wall of the stopper portion (74, 94). Dynamic unbalances can occur due to an uneven distribution of the laundry inside the drum of the laundry treating machine, the vibrations transmitted to the friction damper (10) can be very intense and therefore the damping effect must be effective. According to the present invention, the damping of the vibration is ensured with an increased friction effect by the stopper portion (74, 94) having a variable cross-section at the strike direction of the friction element (40). These inclined contact surfaces (72, 92) have a tip portion, wherein the friction element (40) firstly strikes and prevents the piston rod (20) from striking abruptly against the stopper portion (74, 94) so that the friction damper (10) works quietly even in case of extreme vibration amplitudes.

The friction damper can be compressed and decompressed and the longitudinal forces can be damped effectively with the stopper portion (74, 94). The stopper portion (74, 94) may have a conical structure which strengths friction damper (10) against any shocks that might come from the drum. The stopper portion (74, 94) may be in varying lengths.

Figure 2:
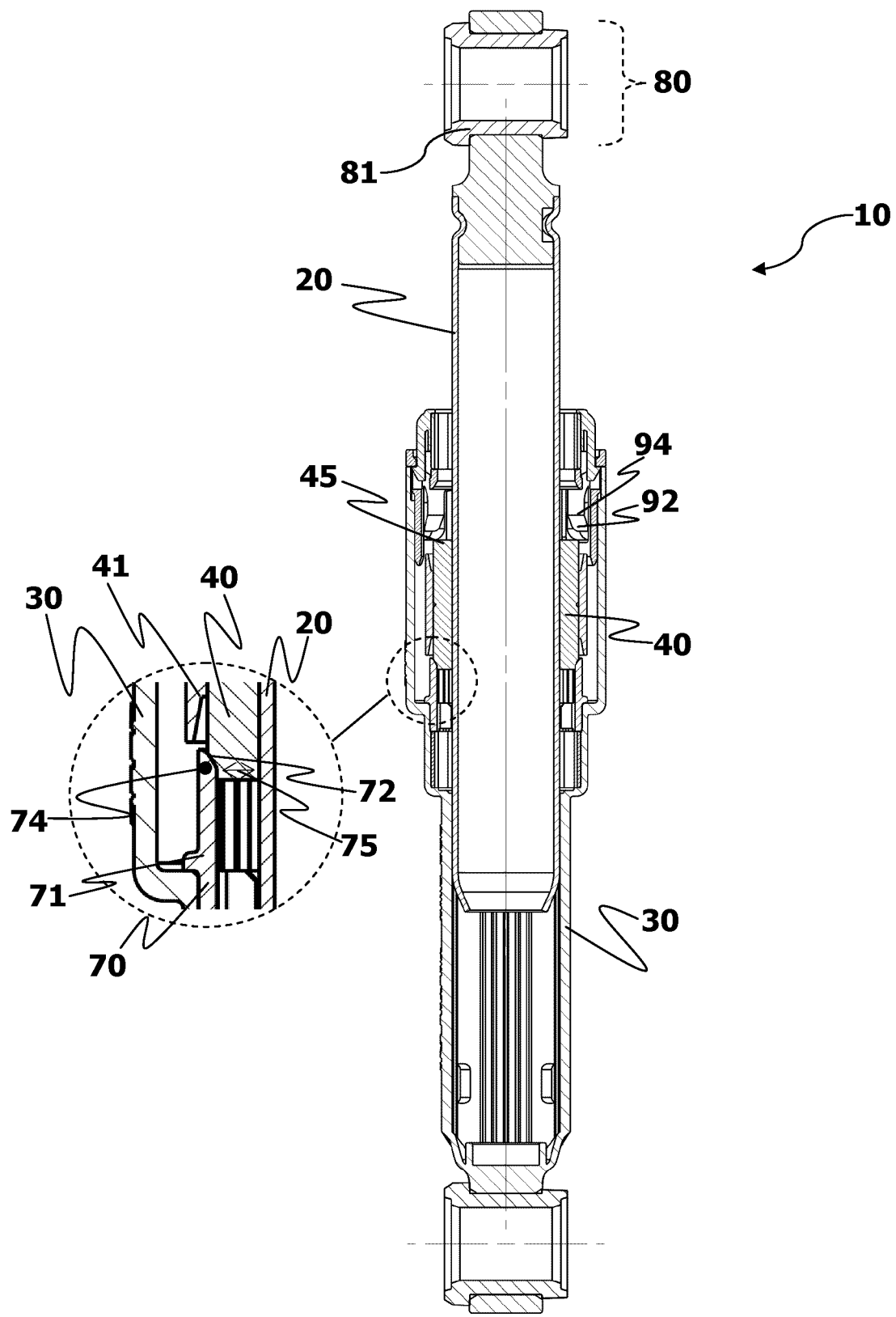
FIG. 2 demonstrates another cross-sectional view of the friction damper shown in FIG. 1 wherein a friction element is stroked to an inclined wall of a stopper element.

In a first embodiment of the present invention shown in FIGS. 1-4, the inclined surface (72, 92) is formed to leave an annular cavity (75) between the stopper portion (74, 94) and the piston rod (20) such that when the friction damper (10) is compressed, said friction element (40) is arranged to at least partially advance through the annular cavity (75). Referring to the FIG. 2, the stopper portion (74) has the inclined contact surface (72) which is spaced apart from the piston rod (20). When the friction damper (10) is in use and is compressed, the friction element (40) strikes the inclined contact surface (72) and moves gradually through the annular cavity (75), as shown in FIG. 2. With this arrangement effective and gradual damping is achieved which helps to improve the quiet operation of the friction damper (10).

Figure 5:
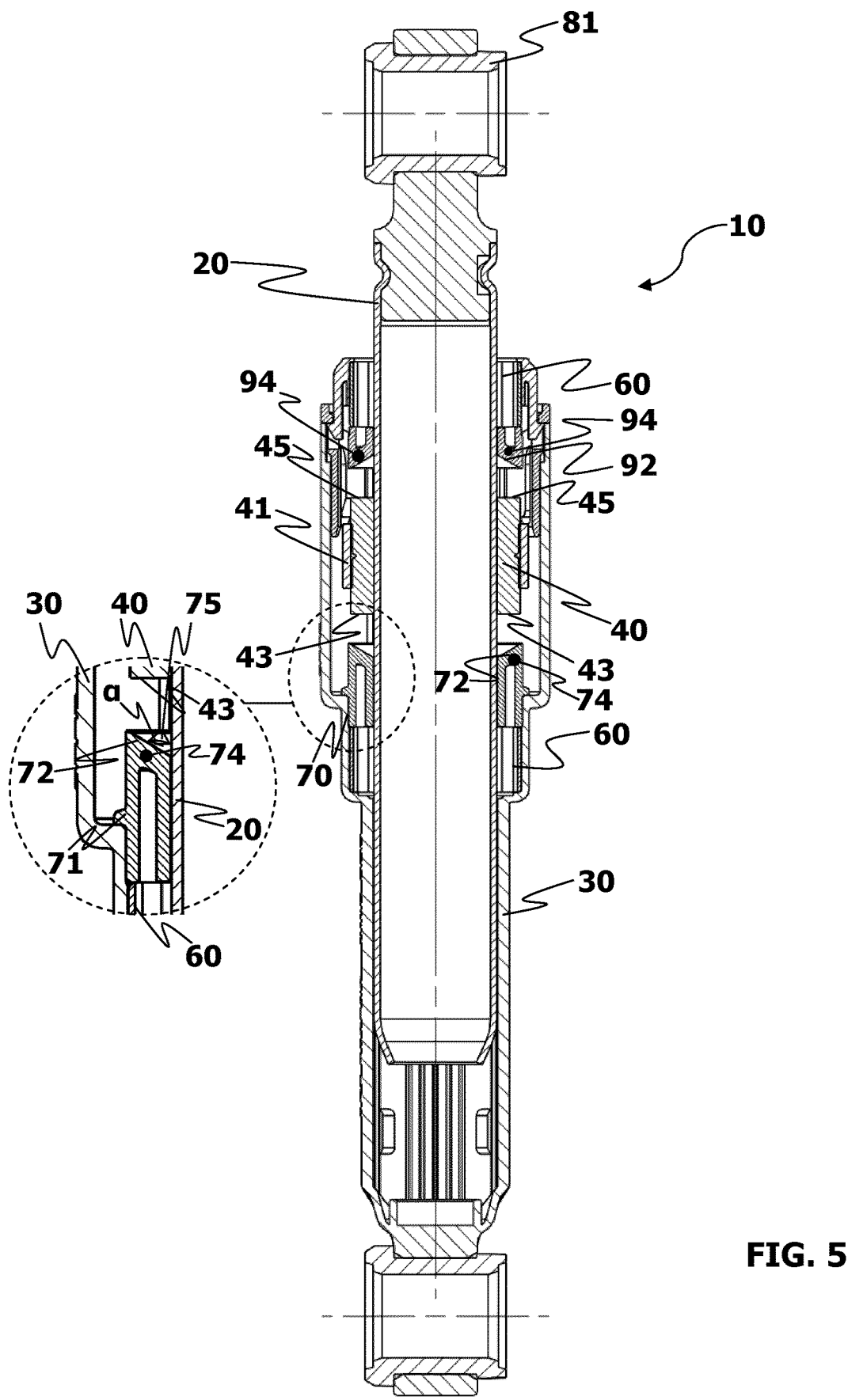
FIG. 5 demonstrates a cross-sectional view of the friction damper according to a second embodiment of the present invention.
Figure 6:
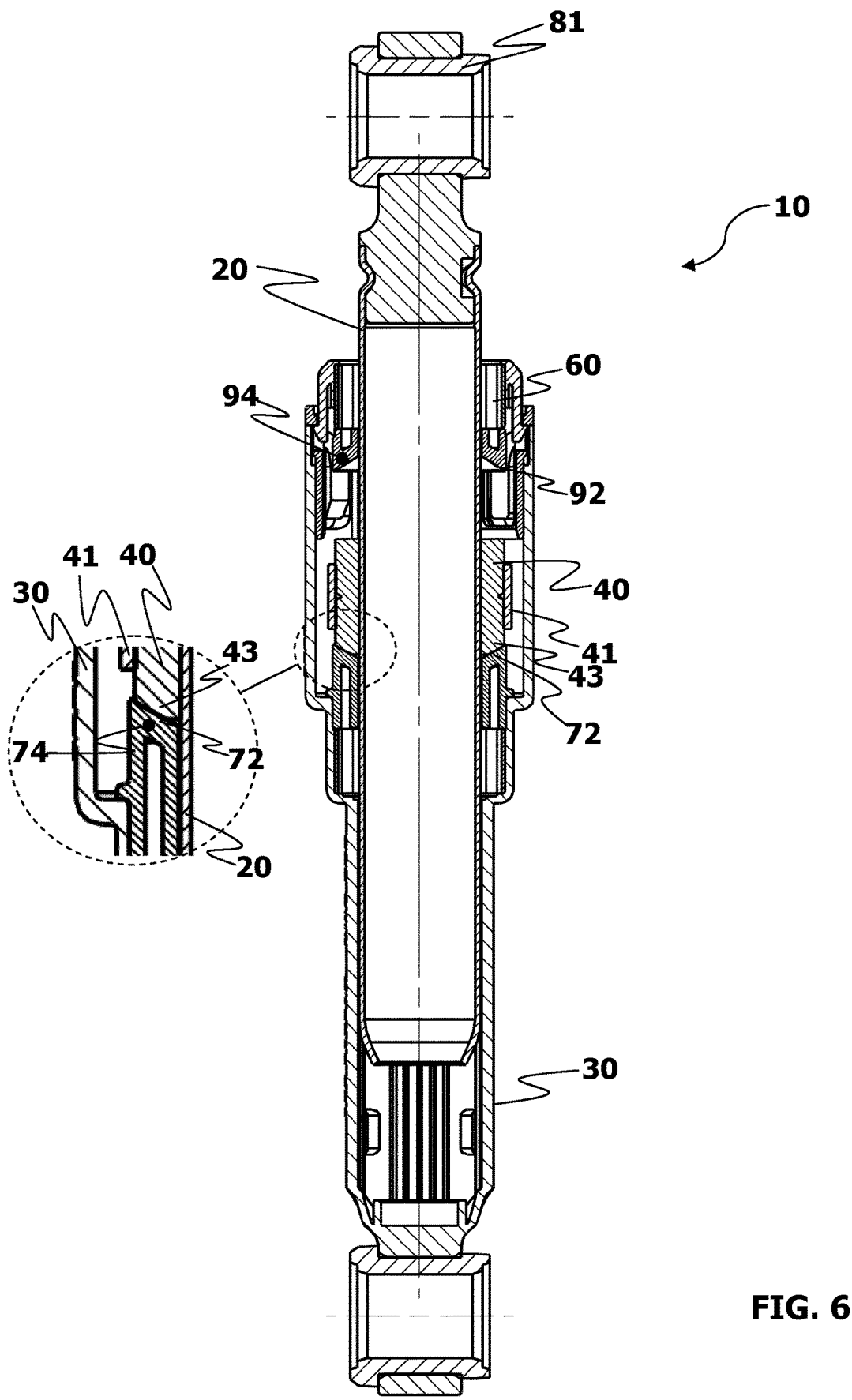
FIG. 6 demonstrates a cross-sectional view of the friction damper shown in FIG. 5 wherein a friction element is hit an inclined wall of a stopper element.
Figure 7:
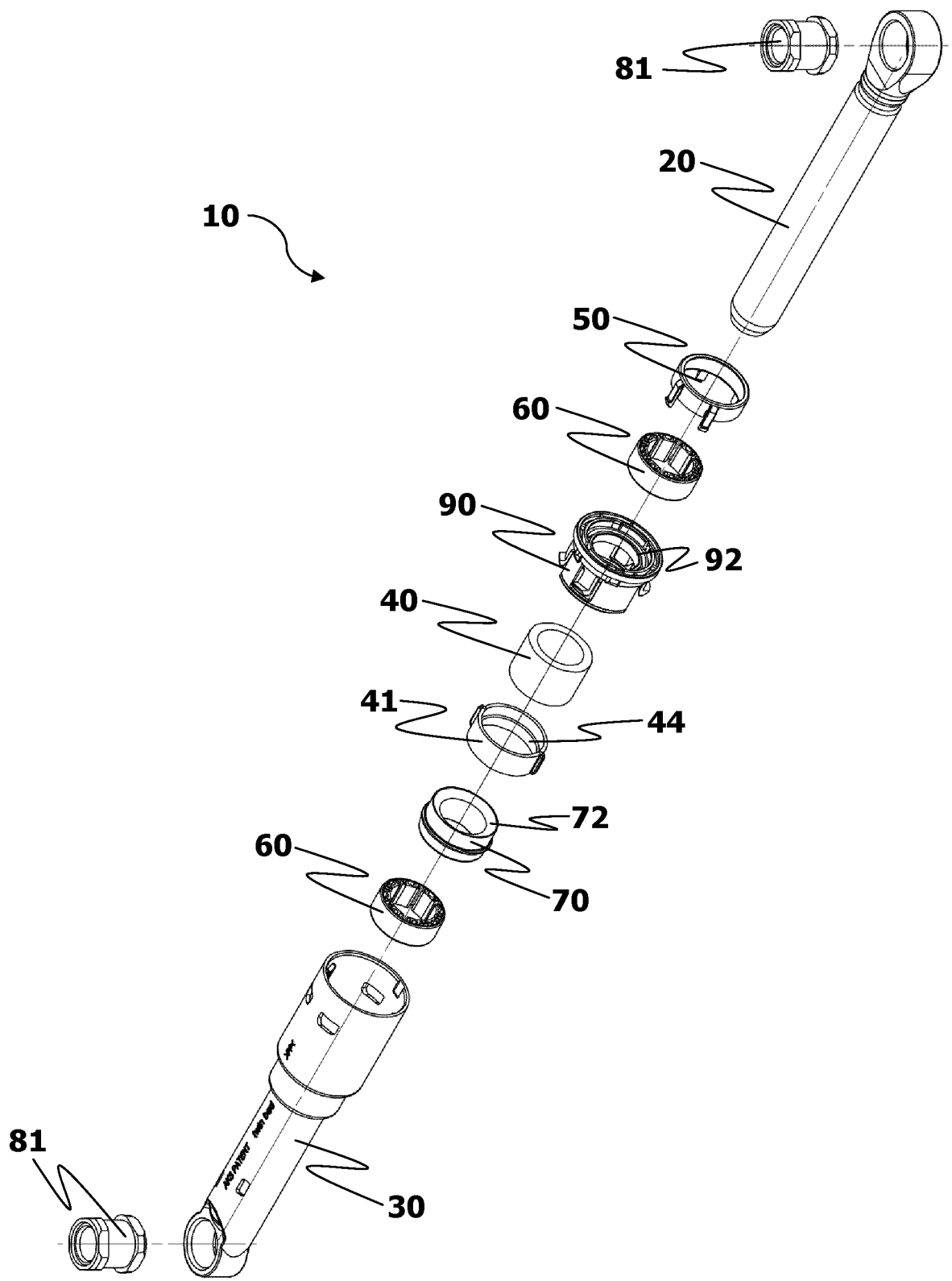
FIG. 7 demonstrates an exploded perspective view of the friction damper shown in FIG. 5.
Figure 10:
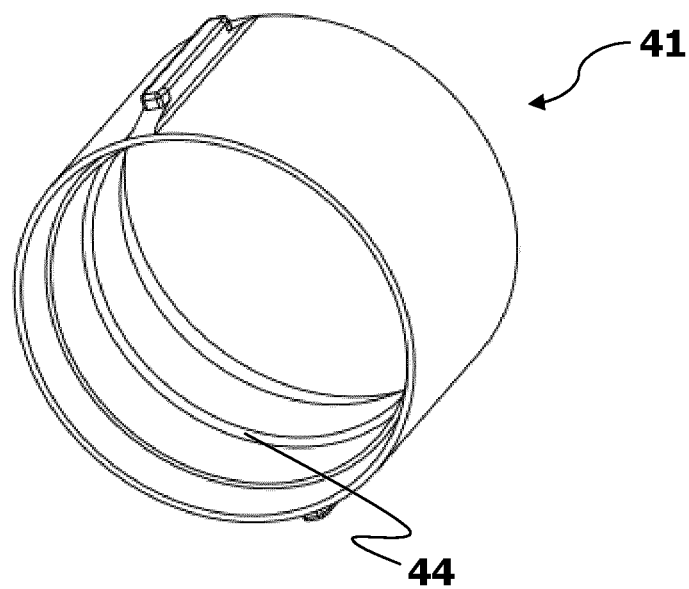
FIG. 10 demonstrates a perspective view of an encapsulating element according to the present invention.

In a second embodiment of the present invention shown in FIGS. 5-7, said at least one stopper portion (74, 94) is formed to be in contact with the piston rod (20) such that the inclined surface (72, 92) extends to the piston rod (20) and limits the movement of the friction element (40) when the friction damper (10) is dampening. Referring to the FIGS. 5 and 6, the stopper portion (74) is formed to be in touch with the piston rod (20) of the friction damper (10). Unlike the first embodiment, the annular cavity (75) is eliminated and the inclined surface (72) is arranged to be in contact with the piston rod (20). With this arrangement, similar effective and gradual dampening is achieved which helps to improve the quiet operation of the friction damper (10). Furthermore, the movement of the friction element (40) is limited. As shown in FIG. 5, the inclined surface (72, 92) has an inclination angle (a) relative to the piston rod (20) of between 30° and 60°, preferably between 40° and 50° and most preferably 45°. With this arrangement, the cross-sectional area of the impact surface (43, 45) is increased and amplitude dependent dampening is enhanced. In the both embodiments, the stopper portion (74, 94) has an increasing cross-section with respect to the longitudinal axis of the piston rod (20) especially with a constant inclination angle. As shown in figures, the friction element (40) is formed as a hollow cylinder body with a frontal flat impact surface (43) facing to the lower fixation element (70) and a rear flat impact surface (45) facing the upper fixation element (90).

Figure 3:
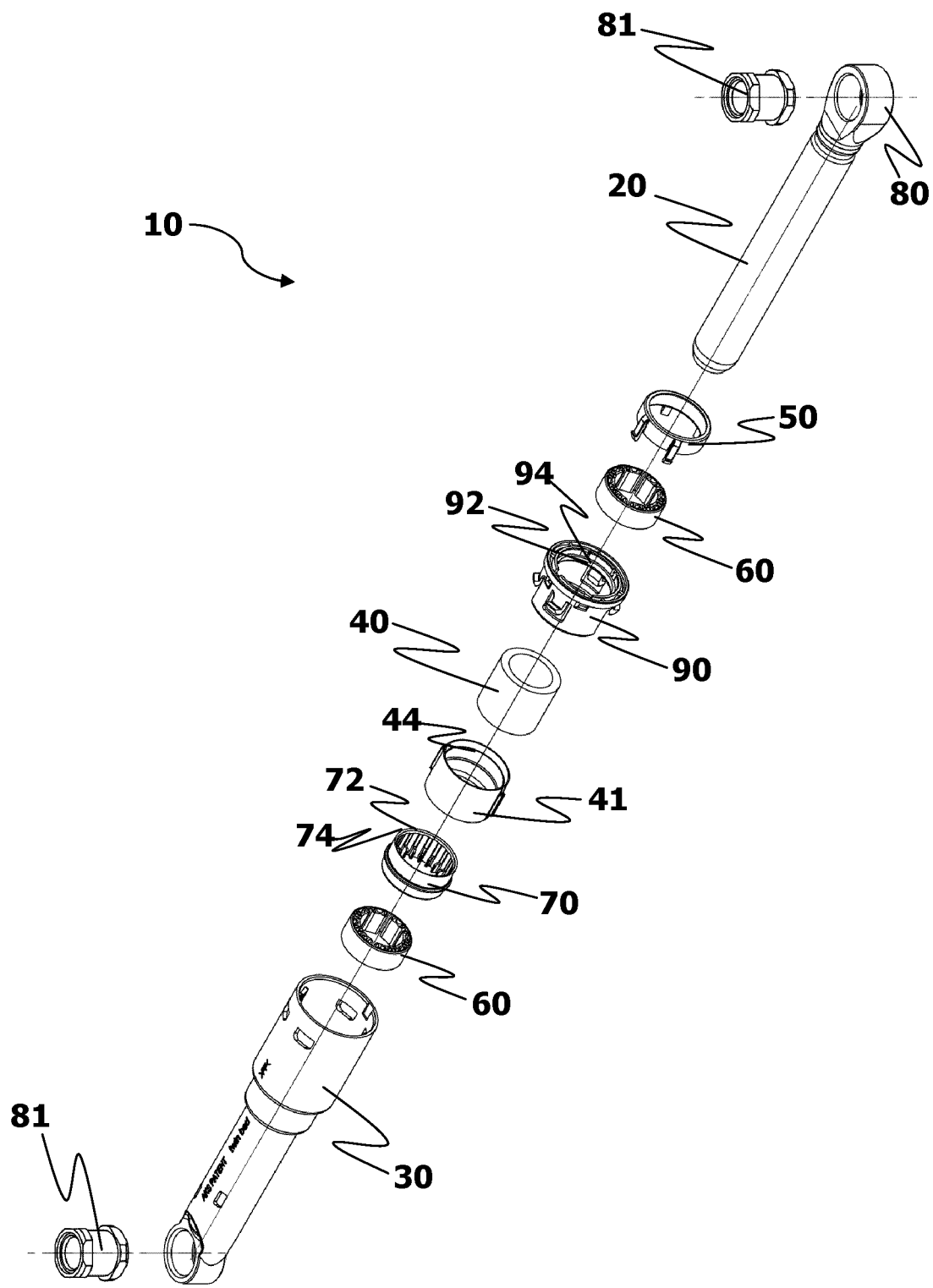
FIG. 3 demonstrates an exploded perspective view of the friction damper shown in FIG. 1.
Figure 4:
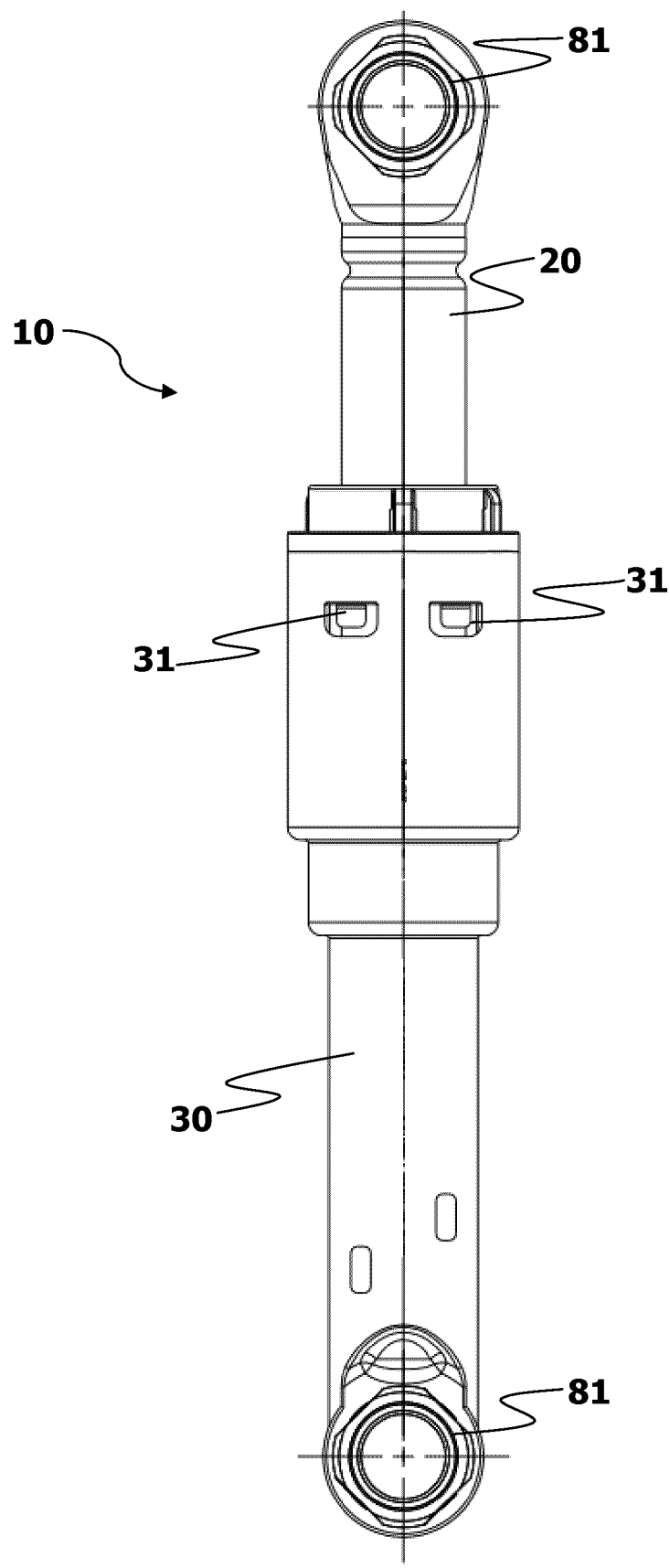
FIG. 4. demonstrates a top view of the friction damper shown in FIG. 1.

The friction damper (10) comprises two stopper portions (74, 94) with a first inclined contact surface (72) and a second inclined contact surface (92) facing the opposite flat impact surfaces (43, 45) of the friction element (40), respectively. Use of two similar two stopper portions (74, 94) increases the efficiency and dampens vibrations at both directions of the telescopic movement of the piston. Referring to FIGS. 3 and 7, the friction damper (10) comprises a separate lower fixation element (70) provided with the stopper portion (74) having the first inclined contact surface (72) at the one of the free ends wherein the lower fixation element (70) comprises a plurality of reinforcement ribs (73) arranged on an inner surface of the lower fixation element (70) in a circumferential direction to reinforce a strength of the lower fixation element (70). Furthermore, the friction damper (10) comprises a separate upper fixation element (90) provided with the stopper portion (94) having the second inclined contact surface (92). Said upper fixation element (90) has a plurality of claws (91) arranged to be attached with the corresponding openings (31) provided at the piston body (30). In a preferred embodiment, said stopper portions (74, 94) are provided at different separate parts positioned on the piston rod (20). These stopper portions (74, 94) delimit the movement of the friction element (40). In a possible embodiment, the free ends of the friction element (40) are arranged to be perpendicular with respect to the central longitudinal axis (X) of said piston body (30). Said free ends of the friction element (40) form the flat impact surfaces (43, 45) of the friction element (40). During oscillatory movement of the piston, each of the flat impact surfaces (43, 45) of the friction element (40) hit the corresponding stopper portions (74, 94) and are smashed in the conical volume defined by the inclined surfaces (72, 92).

In a preferred embodiment, said two stopper portions (74, 94) are formed in the form of a hollow truncated cone having the same inclination with each other and are placed eccentrically with respect to the central longitudinal axis (X) of said piston body (30). The inclination of the two stopper portions (74, 94) can be the same for both or, advantageously, it may be different if need be. Advantageously, the at least one stopper portion (74, 94) can be lined with a layer of material having a high resistance to wear compared to the piston rod (20) such that the friction efficiency can be increased.

Referring to the embodiments of the invention as shown in FIGS. 3 and 7, said friction element (40) is enclosed by at least one encapsulating element (41) in order to fix the position of the friction element (40). Said encapsulating element (41) can be formed on an outer circumferential surface of the friction element (40) to contact with an inner surface of the piston body (30) wherein the encapsulating element (41) is provided with at least one inner protrusion (44) formed on an inner surface of the encapsulating element (41) to prevent the displacement of the friction element (40) in the direction of the central longitudinal axis (X) of the piston body (30).

Referring to FIGS. 8A and 8B, the piston rod (20) is provided with at least one dampening means (60) elastically suitable to dampen forces occurring in directions other than the longitudinal direction of the damper (10). Said dampening means are also used to dampen vibrations in the traverse direction relative to the central longitudinal axis (X) of said piston body (30). In a preferred embodiment, the piston rod (20) is provided with two similar dampening means (60) made of from same material. One of these is in a mechanical communication with the lower fixation element (70) whereas the other is in a mechanical communication with the upper fixation element (90). The dampening means (60) has a plurality of circumferentially oriented flexible portions (61) at the inner side of the dampening means (60) as shown in FIGS. 8A and 8B.

The friction damper (10) can be provided with a locking ring (50) having more than one claw which are shaped and dimensioned to fit to the corresponding apertures provided on the upper fixation element (90). Referring to the FIG. 2, the locking ring (50) is connected to the upper fixation element (90) on the piston rod (20) and acts as a single piece. Furthermore, the lower fixation element (70) is fixed within an enlarged portion of the piston body (30) wherein a circular protrusion (71) of the lower fixation element (70) abuts said enlarged portion of the piston body (30). With this arrangement, a solid and durable friction damper is obtained. Said lower fixation element (70) comprises a plurality of reinforcement ribs (73) arranged on an inner surface of the lower fixation element (70) in a circumferential direction, wherein the distance between said reinforcement ribs (73) forms ventilation openings for discharging heated air produced due to friction.

The friction damper (10) is provided with two fixing portions (80) at its ends, said fixing portions (80) being arranged to be provided with a corresponding fixing part (81). Said fixing part (81) is placed inside the fixing portions (80) and has a suitable connection to the laundry treating machine or the like. The friction damper (10) according to the present invention is generally used in a laundry treating machine and especially in a washing machine or a spin dryer. Preferably, the buffer stop elements are made of plastic material. Said central longitudinal axis (X) represents the axial travel of the piston rod (20) within the piston body (30).

Figure 11:
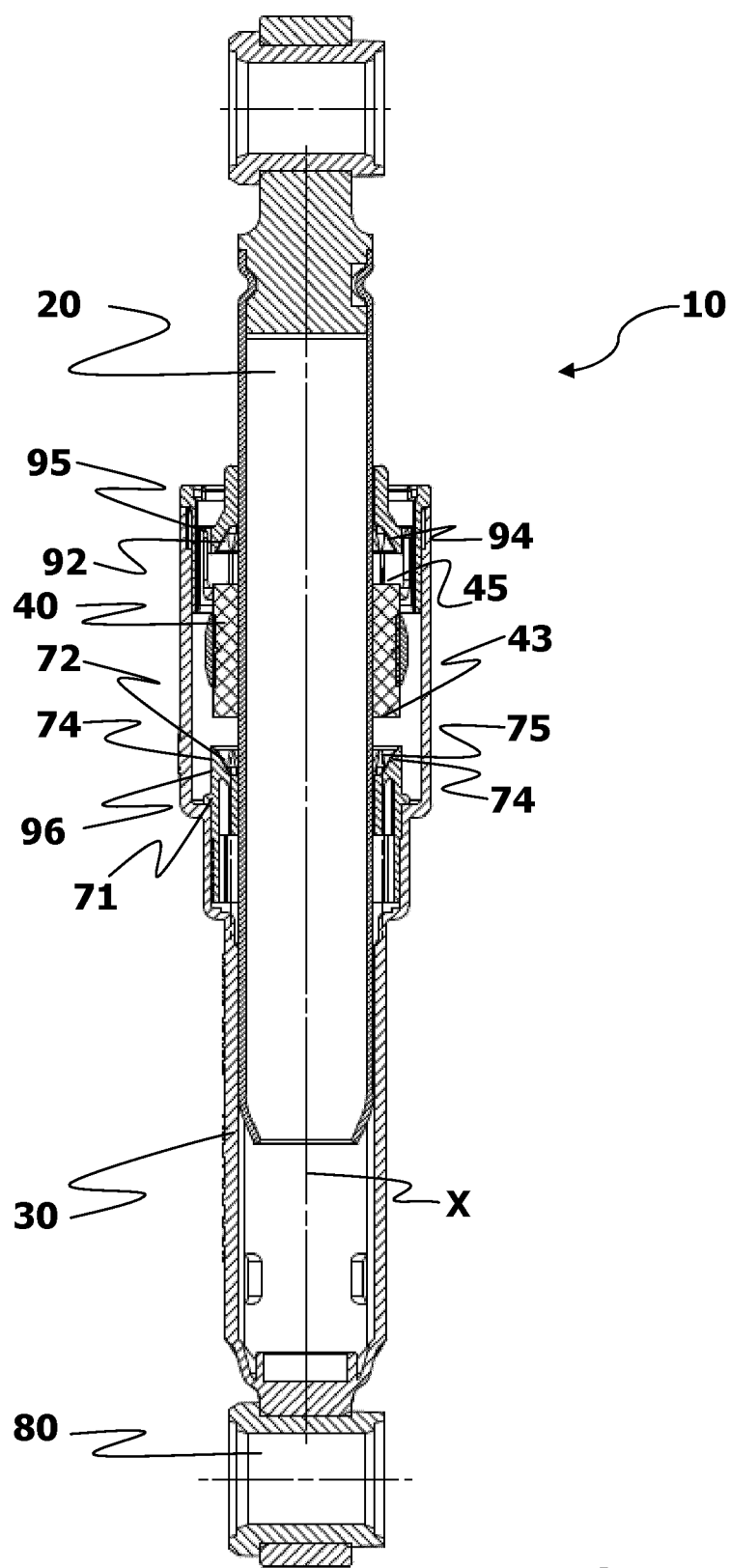
FIG. 11 demonstrates a cross-sectional view of the friction damper according to a third embodiment of the present invention.
Figure 12:
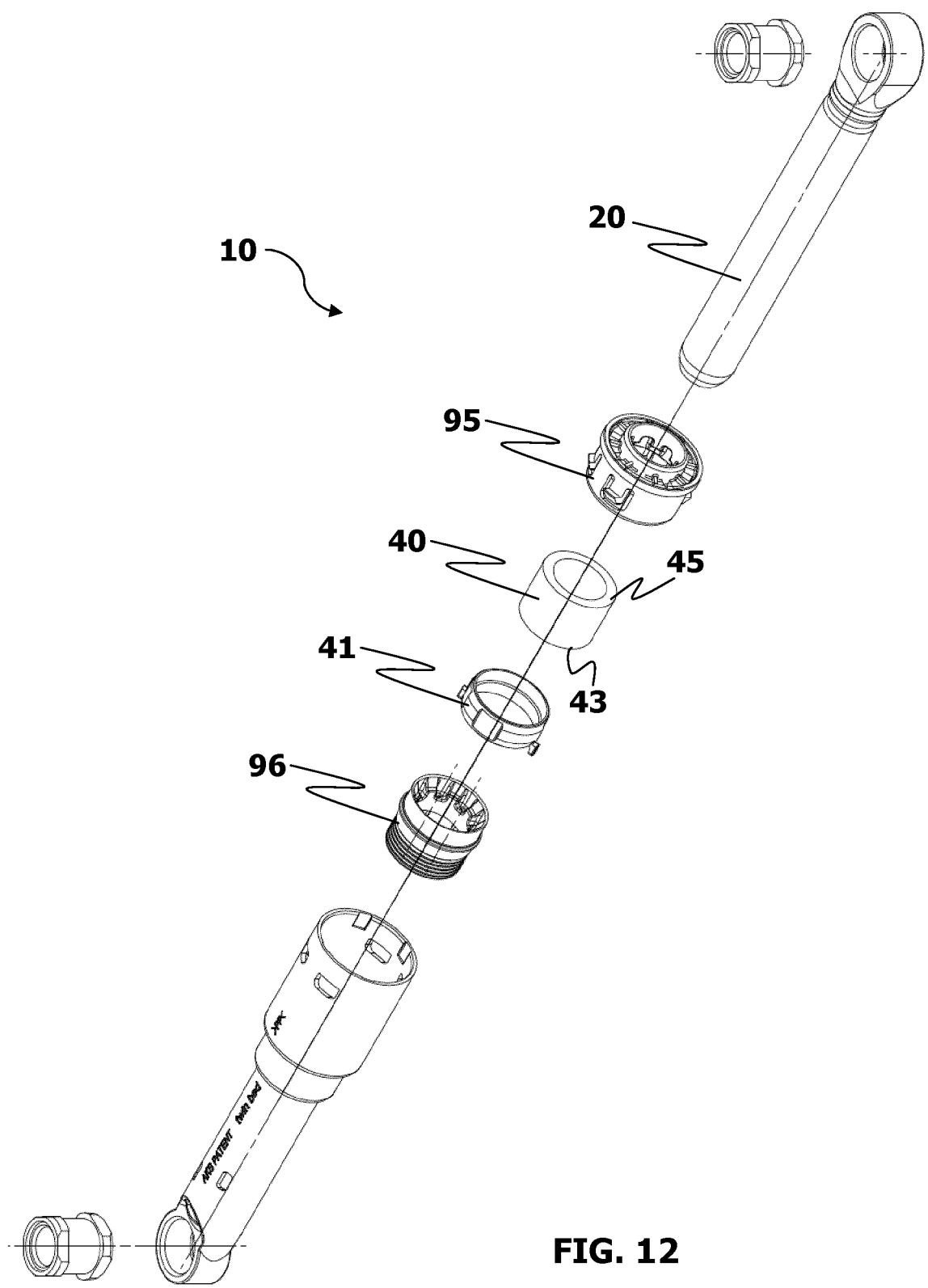
FIG. 12 demonstrates an exploded perspective view of the friction damper shown in FIG. 11.

According to the third embodiment of the invention, as shown in FIGS. 11 and 12, the inclined surface (72, 92) is similarly arranged to form an annular cavity (75) between the stopper portion (74, 94) and the piston rod (20) such that when the friction element (40) hits the stopper portion (74, 94), one of the free ends of the stopper portion (74, 94) smashes and enters partially into said annular cavity (75).

Some features of the friction damper (10) can be assembled and used together. According to the third embodiment of the invention, referring to FIG. 12, an upper seating element (95) can function as the locking ring (50), dampening means (60), and the upper fixation element with the inclined surface (92) together. Similarly, again referring to FIGS. 12 and 11, a lower seating element (96) can function as the dampening means (60), the encapsulating element (41), and the lower fixation element (70) with the inclined surface (72). The upper seating element (95) mainly functions as the upper fixation element (90), and the lower seating element mainly functions as the lower fixation element (70).

As in the lower fixation element (70), the lower seating element (96) has a similar shaped stopper portion (74) with the inclined contact surface (72) and is positioned to face the flat impact surface (43) of the friction element (40) which results in that the friction element (40) having a circular cross-section is pressed more strongly and effectively against the wall of the stopper portion (74). Similarly, the upper seating element (95) has the similarly shaped stopper portion (94) with the inclined contact surface (72) as in the upper fixation element (90) and is positioned to face another flat impact surface (45) of the friction element (40) which results in that the friction element (40) having a circular cross-section is pressed more strongly and effectively against the wall of the stopper portion (74). The inclined surfaces (72, 92) of the lower seating element (96) and the upper seating element (95) are formed to leave an annular cavity (75) between the stopper portion (74, 94) and the piston rod (20) such that when the friction damper (10) is compressed, said friction element (40) is arranged to at least partially advance through the annular cavity (75). With this arrangement, the friction damper (10) works quietly even in the case of extreme vibration amplitudes and produces a variable response in its dissipation of kinetic energy.

What is claimed is:

1. A friction damper for dampening out vibrations generated by a drum of a laundry treating machine, comprising:
    a hollow piston body;
    a piston rod adapted to move telescopically along a central longitudinal axis of the hollow piston body;
    a friction element made of a resilient material interposed in between the hollow piston body and the piston rod, wherein a friction occurs when the piston rod moves relative to the hollow piston body;
    fixation portions provided at free ends of the piston rod and the hollow piston body to connect the friction damper to the laundry treating machine;
    at least one stopper portion interposed in between the hollow piston body and the piston rod for limitation of a motion of the friction element in a direction of the central longitudinal axis, wherein the at least one stopper portion has at least one inclined surface inclined with respect to the central longitudinal axis of the hollow piston body;
    wherein the least one stopper portion comprises a first stopper portion having a first inclined surface and a second stopper portion having a second inclined surface, the first stopper portion and the second stopper portion are separate, the first inclined surface and the second inclined surface face, respectively, opposite a first flat impact surface and a second flat impact surface of the friction element, wherein the first inclined surface and the second inclined surface are positioned to respectively face the first flat impact surface and the second flat impact surface of the friction element and are arranged to be respectively stroked by the first flat impact surface and the second flat impact surface of the friction element, wherein the first inclined surface and the second inclined surface are arranged to form an annular cavity between the first stopper portion, the second stopper portion and the piston rod, wherein when the friction element hits the first stopper portion and the second stopper portion, one of free ends of the first stopper portion and the second stopper portion smashes and enters partially into the annular cavity, wherein the friction damper comprises a separate lower fixation element provided with the first stopper portion having the first inclined surface at one of the free ends of the first stopper portion, wherein the friction damper comprises a separate upper fixation element provided with the second stopper portion having the second inclined surface, and wherein the piston rod is provided with at least one dampening means to dampen vibrations in a traverse direction relative to the central longitudinal axis of the hollow piston body.

2. The friction damper according to the claim 1, wherein the separate lower fixation element is positioned in an enlarged portion of the hollow piston body with a circular protrusion of the separate lower fixation element, wherein the circular protrusion rests on the enlarged portion of the hollow piston body.

3. The friction damper according to claim 2, wherein the first stopper portion and the second stopper portion are formed in a form of a hollow truncated cone having identical inclination and are placed eccentrically with respect to the central longitudinal axis of the hollow piston body.

4. The friction damper according to claim 2, wherein the friction element is enclosed by at least one encapsulating element, wherein the at least one encapsulating element is formed on an outer circumferential surface of the friction element.

5. The friction damper according to the claim 1, wherein the piston rod is provided with two similar dampening means, wherein a first dampening means of the two similar dampening means is in a mechanical communication with the separate lower fixation element and a second dampening means of the two similar dampening means is in the mechanical communication with the separate upper fixation element.

6. The friction damper according to claim 5, wherein the first stopper portion and the second stopper portion are formed in a form of a hollow truncated cone having identical inclination and are placed eccentrically with respect to the central longitudinal axis of the hollow piston body.

7. The friction damper according to claim 1, wherein the first stopper portion and the second stopper portion are formed in a form of a hollow truncated cone having identical inclination and are placed eccentrically with respect to the central longitudinal axis of the hollow piston body.

8. The friction damper according to claim 1, wherein the friction element is enclosed by at least one encapsulating element, wherein the at least one encapsulating element is formed on an outer circumferential surface of the friction element.

9. The friction damper according to claim 8, wherein the at least one encapsulating element is provided with at least one circular inner protrusion formed on an inner surface of the at least one encapsulating element to prevent a movement of the friction element in the direction of the central longitudinal axis of the hollow piston body.

10. The friction damper according to the claim 1, wherein the separate lower fixation element comprises a plurality of reinforcement ribs arranged on an inner surface of the separate lower fixation element in a circumferential direction, wherein a distance between the plurality of reinforcement ribs forms ventilation openings for discharging heated air.

11. The friction damper according to claim 1, wherein the at least one stopper portion is arranged to be in contact with the piston rod, wherein the first inclined surface and the second inclined surface limit a movement of the friction element in the direction of the central longitudinal axis when the friction element hits the at least one stopper portion.

12. The friction damper according to claim 11, wherein the first inclined surface and the second inclined surface have an inclination angle relative to the piston rod of between 30° and 60°.

13. A laundry treating machine having a drum, comprising the friction damper of claim 1.

14. The friction damper according to claim 1, wherein the first stopper portion and the second stopper portion are formed in a form of a hollow truncated cone having identical inclination and are placed eccentrically with respect to the central longitudinal axis of the hollow piston body.

15. The friction damper according to claim 1, wherein the first stopper portion and the second stopper portion are formed in a form of a hollow truncated cone having identical inclination and are placed eccentrically with respect to the central longitudinal axis of the hollow piston body.

16. The friction damper according to claim 1, wherein the first stopper portion and the second stopper portion are formed in a form of a hollow truncated cone having identical inclination and are placed eccentrically with respect to the central longitudinal axis of the hollow piston body.

17. The friction damper according to claim 1, wherein the friction element is enclosed by at least one encapsulating element, wherein the at least one encapsulating element is formed on an outer circumferential surface of the friction element.

* * * * *